United States Patent
Weise et al.

(10) Patent No.: US 10,013,787 B2
(45) Date of Patent: Jul. 3, 2018

(54) METHOD FOR FACIAL ANIMATION

(75) Inventors: Thibaut Weise, Zürich (CH); Sofien Bouaziz, Lausanne (CH); Hao Li, New York, NY (US); Mark Pauly, Lausanne (CH)

(73) Assignee: Faceshift AG, Zurich (CH)

( * ) Notice: Subject to any disclaimer, the term of this patent is extended or adjusted under 35 U.S.C. 154(b) by 38 days.

(21) Appl. No.: 13/323,231

(22) Filed: Dec. 12, 2011

(65) Prior Publication Data

US 2013/0147788 A1    Jun. 13, 2013

(51) Int. Cl.
   *G06T 13/40*   (2011.01)
   *G06K 9/62*   (2006.01)
   *G06K 9/00*   (2006.01)

(52) U.S. Cl.
   CPC .......... *G06T 13/40* (2013.01); *G06K 9/00315* (2013.01); *G06K 9/6247* (2013.01); *G06K 9/6277* (2013.01)

(58) Field of Classification Search
   CPC ....... G06T 13/40; G06T 13/80; G06T 19/006; G06T 11/60; G06T 13/00; G06T 19/20; G06T 2207/30201
   See application file for complete search history.

(56) References Cited

U.S. PATENT DOCUMENTS

| | | | |
|---|---|---|---|
| 7,274,822 B2 * | 9/2007 | Zhang et al. | 382/224 |
| 7,853,085 B2 * | 12/2010 | Miller | 382/215 |
| 8,369,653 B1 * | 2/2013 | Cohen | 382/299 |
| 2004/0190775 A1 * | 9/2004 | Miller | 382/190 |
| 2006/0023923 A1 * | 2/2006 | Geng | G06T 19/20 382/116 |
| 2007/0052698 A1 * | 3/2007 | Funayama | G06T 7/277 345/419 |
| 2007/0260984 A1 * | 11/2007 | Marks et al. | 715/706 |
| 2009/0010515 A1 * | 1/2009 | Sinop et al. | 382/131 |
| 2010/0086215 A1 * | 4/2010 | Bartlett et al. | 382/197 |
| 2010/0149177 A1 * | 6/2010 | Miller | 345/419 |
| 2010/0150406 A1 * | 6/2010 | Xiao et al. | 382/118 |

(Continued)

OTHER PUBLICATIONS

PrimeSense, The PrimeSensor: The PrimeSense 3D Sensing Solution, http://www.primesense.com/en/press-room/resources/file/4-primesensor-data-sheet © 2011, 3 pages.

(Continued)

*Primary Examiner* — Zhengxi Liu
*Assistant Examiner* — Raffi Isanians
(74) *Attorney, Agent, or Firm* — Blank Rome LLP

(57) ABSTRACT

A method of animating a digital character according to facial expressions of a user, comprising the steps of, (a) obtaining a 2D image and 3D depth map of the face of the user, (b) determining expression parameters for a user expression model so that a facial expression of the user-specific expression model represents the face of the user shown in the 2D image and 3D depth map (c) using the expression parameters and an animation prior to determine animation parameters usable to animate a digital character, wherein the animation prior is a sequence of animation parameters which represent predefined animations of a digital character (d) using the animation parameters to animate a digital character so that the digital character mimics the face of the user.

18 Claims, 1 Drawing Sheet

(56) References Cited

U.S. PATENT DOCUMENTS

| | | | |
|---|---|---|---|
| 2010/0211397 A1* | 8/2010 | Park .................... | G10L 17/26 704/276 |
| 2011/0064388 A1* | 3/2011 | Brown et al. .............. | 386/285 |
| 2011/0310237 A1* | 12/2011 | Wang et al. .................. | 348/77 |
| 2012/0069028 A1* | 3/2012 | Bouguerra .................. | 345/473 |
| 2012/0280974 A1* | 11/2012 | Wang .................... | G06T 13/40 345/419 |

OTHER PUBLICATIONS

Asus eStore: Parts & Accessories, Xtion Pro Live, http://us.estore.asus.com/index.php?I=product_detail&p=4001, 2 pages.

Mesa Imaging, SR4000 Data Sheet, http://www.mesa-imaging.ch/dlm.php?fname=pdf/SR4000_Data_Sheet.pdf, Aug. 26, 2011, 8 pages.

* cited by examiner

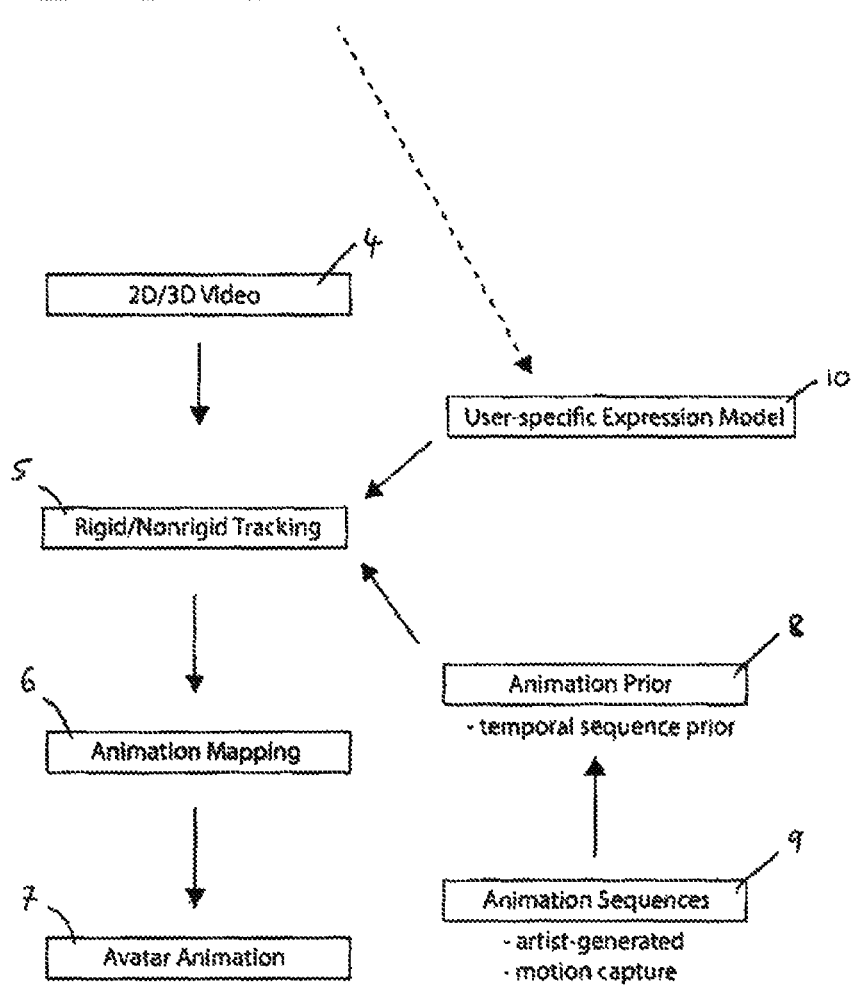

METHOD FOR FACIAL ANIMATION

FIELD OF THE INVENTION

The present invention relates to a method for facial animation, in particular, but not exclusively, to a method for facial animation which uses 2D images, 3D depth maps and animation priors, to achieve tracking of the facial expressions of a user.

DESCRIPTION OF RELATED ART

Capturing and processing human geometry, appearance, and motion is at the core of modern computer animation. Digital actors are often created through a combination of 3D scanning and appearance acquisition; motion capture is used to animate the digital actors. However, disadvantageously, these existing methods of creating and animating digital actors require complex acquisition systems and substantial manual post-processing. As a result, creating and animating digital actors using existing methods, requires long turn-around times and substantial production costs.

Moreover, existing method for animating digital actors lack robustness; very often these existing methods fail in the presence of noise sources e.g. when the inputs to the animation system are corrupted by noise.

It is an aim of the present invention to mitigate or obviate at least some of the above-mentioned disadvantages.

BRIEF SUMMARY OF THE INVENTION

According to the invention, these aims are achieved by means of a method of animating a digital character according to facial expressions of a user, comprising the steps of, (a) obtaining a 2D image and 3D depth map of the face of the user, (b) determining expression parameters for a user expression model so that a facial expression of the user-specific expression model represents the face of the user shown in the 2D image and 3D depth map (c) using the expression parameters and an animation prior to determine animation parameters usable to animate a digital character, wherein the animation prior is a sequence of animation parameters which represent predefined animations of a digital character (d) using the animation parameters to animate a digital character so that the digital character mimics the face of the user.

The animation prior may be a sequence of animation parameters which represent predefined animations of a generic digital character. The animation parameters may comprise a temporal sequence of expression parameters. The animation prior may comprise a collection of animation sequences, wherein each animation sequence is a temporal sequence of expression parameters. The expression parameters may comprise blendshapes and/or blendshape weights.

The method may comprise the step of determining expression parameters for a user expression model for each frame in a series of frames each of which depict a user's face at a different point in time, to provide a sequence of expression parameters. The expression parameters may comprise blendshapes and/or blendshape weights.

A blendshape is an expression parameter such as, for example, "open mouth"; a blendshape weight represents the extent of the blendshape; for example the blendshape "open mouth" which has a blendshape weight of "1" will represent a fully opened mouth, the blendshape "open mouth" which has a blendshape weight of "0" will represent a fully closed mouth. An expression may be represented by a combination of blendshapes and blendshape weights, for example a smile may be represented by a combination of a first blendshape which is "right side smile" (i.e. "the smile of the right half of the mouth") and a second blendshape which is a "left side smile" (i.e. "the smile of the left half of the mouth"), a full smile will be a combination of the first and second blendshapes, and the extend of the smile will be represented by the blendshape weights for each blendshape.

The expression parameters and animation prior may be used in an optimisation calculation to calculate the animation parameters usable to animate a digital character.

The method may comprise the step of carrying out an optimisation calculation for the sequence of expression parameters and the animation prior, to provide the animation parameters usable to animate a digital character, so that the animation parameters best match the expression parameters of an animation sequence in the animation prior.

The method may comprise the step of applying weights to the sequence of expression parameters and the animation prior so that the animation parameters, which are used to animate the digital character, can be made to better match the user's face or animation prior.

The optimization calculation may comprise calculating a maximum a posterior estimation.

The method may further comprise, repeating steps (a)-(d) so that the face of the user is tracked over a period of time, and the digital character mimics the face of the user over that period of time.

The 2D image and 3D depth map of the face of a user may be obtained simultaneously. The 2D image and 3D depth map of the face of a user may be obtained using a real-time depth sensor.

The method may comprise the steps of decoupling rigid motion of a user from non-rigid motion of a user and tracking rigid motion of a user and non-rigid motion of a user independently, wherein rigid motion is a movement of the position of the face of a user and non-rigid motion is a change in expression of the face of a user.

The step of tracking rigid motion of a user, may comprise aligning the 3D depth map of the face of the user with a user expression model from the preceding iteration of the method, so that the position of the user-specific expression model is moved to a position which best represents the position of the face of the user shown in the 3D depth map.

The step of tracking rigid motion may comprise the step of using a pre-segmented template that excludes a chin region to stabilise alignment of the 3D depth map with the user-specific expression model.

The step of tracking rigid motion may comprise the step of filtering using a temporal filter to reduce high frequency flickering of tracking parameters. The tracking parameters may be parameters which represent a rigid motion and/or non rigid motion of a user. The tracking parameters may be parameters which define a pose of a user and/or an expression of the face of a user. The tracking parameters may comprise blendshape weights.

The step of tracking non-rigid motion of a user, may comprise, for each iteration of the method, performing a single optimization calculation using the animation priors and the 2D image and 3D depth map of face of the user, to determine the expression parameters required to update the user-specific expression model so it best represents the facial expression of the face of the user shown in the 3D depth map and 2D image.

The step of tracking non-rigid motion of a user may comprise the step of regularizing the expression parameters with a dynamic expression prior computed to prevent unrealistic face poses.

The single optimization may be performed using an iterative gradient solver.

The method may further comprise the step of mapping the animation parameters into a form which is readable by an animation tool, so that the animation tool can animate the digital character according to the animation parameters.

The method may further comprise a calibration step wherein the user-specific expression model is generated; wherein the calibration step comprises the steps of, obtaining 2D images and 3D depth maps of a face of a user for a plurality of predefined facial expressions; determining a set of model parameters which represent the face of the user shown in the 2D images and 3D depth maps; using the model parameters to modify a generic expression model to provide a user-specific expression model.

The step of modify a generic expression model comprises the step of modifying blendshapes defined for the generic expression model so that a facial geometry defined by each of the blendshapes matches the facial geometry of the face of the user shown in the 2D images and 3D depth maps. The modified blendshapes may define the user-specific expression model.

The calibration step may be carried out offline. The calibration step may be carried out online. The generic expression model may be a generic blendshape model. The model parameters may be a set of blendshape weights which represent the face of a user for a plurality of predefined facial expressions.

The method may further comprise the step of generating animation sequences for a generic model. The method may further comprise the step of generating a plurality of animation sequences for a generic model. This may be done using a standard animation tool. The method may comprise the step of storing these animation sequences to define an animation prior. The animation sequences may be defined by expression parameters. The method may further comprise the step storing the expression parameters in a memory so that they define an animation prior.

The method may comprise the step of generating an animation prior by retrieving expression parameters from another digital character animation system. The method may further comprise the step of mapping an animation sequence of another digital character animation system to provide an animation prior which comprises expression parameters in a form which is compatible with an animation tool which is used to animate the digital character.

The method may further comprise the step of representing the expression parameters as a series of blendshape weights. The method may further comprise the step of representing the facial expressions as a series of blendshape weights. The method may further comprise the step of representing the user-specific expression model and/or the generic expression model as a series of blendshapes.

The expression models may be blendshapes, the expression parameters may be blendshape weights.

The method may further comprise a post processing step of performing a second optimization calculation, which uses both a database of animation sequences for the digital character and the mapped animation parameters.

A computer medium comprising program code to be executed by a signal processing device, said program code being configured to carry out any one of the afore-mentioned methods when said program code is executed by said signal processing device.

BRIEF DESCRIPTION OF THE DRAWINGS

The invention will be better understood with the aid of the description of an embodiment of the present invention, which is given by way of example only, and illustrated by the figure, in which:

FIG. 1 shows a flow chart of the steps involved in a method according to one embodiment of the present invention.

DETAILED DESCRIPTION OF POSSIBLE EMBODIMENTS OF THE INVENTION

FIG. 1 shows a flow chart of the steps involved in a method of animating a digital character according to facial expressions of a user, according to one embodiment of the present invention. The method is divided into two stages; a calibration stage (A) and a tracking stage (B). In this particular example the calibration stage is carried out offline (i.e. before the tracking stage is executed), however it will be understood that the calibration stage could also be carried out online.

During the calibration stage a user-specific expression model is generated. The user performs a plurality of predefined facial expressions e.g. a neutral facial expression, smiling, a facial expression depicting anger, a facial expression depicting excitement, etc. As the user is performing the plurality of predefined facial expressions, 2D images and 3D depth maps of a face of a user are obtained and recorded for each of the plurality of predefined facial expressions (1). These 2D images and 3D depth maps of a face of a user are obtained and recorded simultaneously using any suitable real-time depth sensor; for example a Kinect™ system. Advantageously, the Kinect™ system is a low-cost acquisition device and can be easily deployed and offers sustained operability in a natural environment. The user is neither required to wear any physical markers or specialized makeup, nor is the performance adversely affected by intrusive light projections or clumsy hardware contraptions. If the 2D images and 3D depth maps of a face of a user are obtained and recorded using a Kinect™ system multiple scans over time may be aggregated to mitigate problem of noise. Preferably, the user also performs a slight head rotation while keeping the facial expression fixed. Besides exposing the entire face of the user to the scanner, this rotational motion has the additional benefit of alleviating reconstruction bias introduced by the spatially fixed infrared dot pattern projected by the Kinect™ system. It will be understood that the present invention is not limited to use with the Kinect™ system, other suitable systems may alternatively be used.

From these 2D images and 3D depth maps a set of model parameters which represent the face of the user shown in the 2D images and 3D depth maps are determined (2). The model parameters may comprise a polygonal mesh for each facial expression of the user. To improve accuracy additional texture constraints may be applied to the mouth and eye regions so that additional model parameters are obtained for these particular regions; these particular regions of the user face show the most deformation when performing facial expressions.

These model parameters are used to modify a generic expression model to provide a user-specific expression model (3). A generic expression model is an expression model defined for a generic person (male or female) and a user-specific expression model is an expression model defined for a specific person. Modifying a generic expression model to provide a user-specific expression model (3) may comprise representing the generic expression model as blendshapes, and determining a set of approximate blendshape weights that specify an appropriate linear combination of the blendshapes which represent the model parameters for each of the predetermined facial expressions. Since the facial expressions performed by the user are predefined, these approximate blendshape weights can be determined once and kept constant for all users. Given this data, example-based facial rigging may be used to perform a gradient-space optimization in order to construct a set of user-specific blendshapes that define the user-specific expression model.

Once the user-specific expression model is generated, this is the end of the calibration stage (A). The user-specific expression model is used in the proceedings tracking stage (B).

In general the tracking stage comprises the steps of obtaining a 2D image and 3D depth map of the face of the user (4). The 2D image and 3D depth map of the face of a user may be obtained simultaneously and may be obtained using a real-time depth sensor.

Expression parameters for a user expression model are then determined so that a facial expression of the user-specific expression model can be updated to best represent the face of the user shown in the 2D image and 3D depth map (10). In this particular example the expression parameters are represented as a series of blendshape weights.

Animation priors and the expression parameters, are used in an optimisation calculation to determine said animation parameters which are used to animate the digital character. Each animation prior is a collection of animation parameters which represents a predefined animation for a generic model. The method may further comprise the step of generating said animation priors (9). In this particular example, generating said animation priors (9) comprise the steps of user using an animation tool to animate a generic model and deriving expression parameters which represent the animation of the generic model; the expression parameters for a sequence of animations may be stored in a memory to define an animation prior. The animation prior may be defined mathematically so that it can be included in an optimisation calculation. Alternatively the step of generating said animation prior may comprise retrieving expression parameters from another digital character animation system and storing them in memory.

The step of determining animation parameters comprises decoupling rigid motion of a user from non-rigid motion of a user and tracking rigid motion of a user and non-rigid motion of a user independently, wherein rigid motion is a movement of the position of the face of a user and non-rigid motion is a change in expression of the face of a user.

Tracking the rigid motion of a user comprises aligning the 3D depth map of the face of the user with a user expression model from the preceding iteration of the method, so that the position of the user-specific expression model is moved to a position which best represents the position of the face of the user shown in the 3D depth map. Alignment may be achieved with point-plane constraints.

A pre-segmented template that excludes a chin region may be used to stabilise alignment of the 3D depth map with the user-specific expression model. The chin region typically exhibits the strongest deformation with the user performs a facial expression, therefore by excluding the chin region a stabilised alignment of the 3D depth map with the user-specific expression model, can be achieved. This enables robust tracking of rigid motion even for large occlusions and extreme facial expressions.

Tracking rigid motion may also comprise the step of filtering using a temporal filter to reduce high frequency flickering of the tracking parameters. The filter is based on a sliding window that dynamically adapts the smoothing coefficients in the spirit of an exponentially weighted moving average method to reduce high frequency noise while avoiding disturbing temporal lags. The method may include independently filtering a translation vector which represents linear displacement in the position of the user's face and quaternion representation of a rotation of the users face. For a translation or quaternion vector $t_i$ at the current time frame i, a smoothed vector is computed as weighted average in a window of size k as:

$$t_i^* = \frac{\sum_{j=0}^{k} w_j t_{i-j}}{\sum_{j=0}^{k} w_j} \quad (1)$$

where $t_{i-j}$ denotes the vector at frame i-j. The weights $w_j$ are defined as:

$$w_j = e^{-j \cdot H \cdot max_{l \in [1,k]} \|t_i - t_{i-l}\|}, \quad (2)$$

with a constant H that is empirically determined independently for rotation and translation based on the noise level of a static pose. Scaling the time scale with a maximum variation in a temporal window ensures that less averaging occurs for fast motion, while high-frequency jitter is effectively removed from an estimated rigid pose. This leads to a stable reconstruction when the user is perfectly still, while fast and jerky motion can still be recovered accurately.

Tracking non-rigid motion of a user is used to capture the dynamics of the facial expression of the user e.g. to estimate the blendshape weights that capture the dynamics of the facial expression of the recorded user. The aim is to determine animation parameters which will animate the digital character so that the digital character mimics the user's facial performance as closely as possible, while at the same time ensuring that the reconstructed animation lies in the space of realistic human facial expressions. The present invention achieves this aim by determining a sequence of expression parameters required for the user specific model to mimic the user's facial expression; instead of applying these expression parameters directly to the digital character, an optimisation of these expression parameters and animation priors (i.e. a mathematical representation of the animation prior) is performed. The inclusion of a mathematical representation of the animation prior into an optimisation calculation ensures that the animation parameters output from the optimisation will animate the digital character within the space of realistic human facial expressions.

Tracking non-rigid motion of a user comprises, for each iteration of the method (i.e. for each frame in a sequence of frames; or, more specifically, for each 2D image and 3D depth map of face of the user in a sequence of 2D image and 3D depth map), performing a single optimization calculation using the animation prior and the expression parameters of a user-specific expression model as the user-specific expression model represents the facial expression of the face of the user shown in the 3D depth map and 2D image. The single optimization is performed using an iterative gradient solver. Decoupling rigid motion and non-rigid motion of a user simplifies the formulation of the optimization, and also leads to improved robustness of the tracking.

It will be understood that any suitable optimization method may be used; in this particular example facial expressions/expression parameters are represented as blendshape weights and the optimization calculation comprises a maximum a posterior (MAP) estimation which is carried out as follows:

The first step includes a MAP estimation. Let $D_i=(G_i, I_i)$ be input data at the current frame i consisting of a depth map $G_i$ and a colour image $I_i$. It is sought to infer from $D_i$ the most probable blendshape weights $x_i \in R^m$ for the current frame given the sequence $X_n{}^i=x_{i-1}, \ldots, x_{i-n}$, of n previously reconstructed blendshape vectors. The inference problem can be formulated as a maximum a posteriori (MAP) estimation as follows:

$$x^*=\arg \max_x p(x|D, X_n), \quad (3)$$

where $p(\cdot|\cdot)$ denotes the conditional probability. Applying Bayes' rule the following is obtained:

$$x^*=\arg \max_x p(D|x, X_n)p(x, X_n), \quad (4)$$

Assuming that D is conditionally independent of $X_n$ given x, it can be equation (5) can be concluded:

$$x^* \approx \arg \max_x p(D|x)p(x, X_n) \quad (5)$$

The next step involves prior distribution. To adequately capture the nonlinear structure of the dynamic expression space while still enabling real-time performance, a prior term $p(x, X_n)$ is represented as a mixture of Probabilistic Principal Component Analyzers (MPPCA). Probabilistic principal component analysis (PPCA) defines the probability density function of some observed data $x \in R^s$ by assuming that x is a linear function of a latent variable $z \in R^t$ with s>t, i.e., $$x=Cz+\mu+\epsilon, \quad (6)$$

wherein $z \sim N(0, I)$ is distributed according to a unit Gaussian, $C \in R^{s \times t}$ is the matrix of principal components, $\mu$ is the mean vector, and $\epsilon \sim N(0, \sigma^2 I)$ is a Gaussian-distributed noise variable. The probability density of x can then be written as:

$$p(x)=N(x|\mu, CC^T+\sigma^2 I). \quad (7)$$

Using this formulation, the prior in Equation 5 is defined as a weighted combination of K Gaussians:

$$p(x,X_n)=\Sigma_{k=1}^K \pi k N(x, X_n|\mu_k, C_k C_k^T+\sigma_k^2 I). \quad (8)$$

with weights $\pi_k$. This representation can be interpreted as a reduced-dimension Gaussian mixture model that attempts to model the high-dimensional animation data with locally linear manifolds modelled with Probabilistic principal component analysis (PPCA).

Following the prior distribution step, the step of learning the prior is carried out. The unknown parameters in Equation (8) are the means the covariance matrixes $C_k C_k^T$, the noise parameters $\sigma k$, and the relative weights $\pi_k$ of each PPCA in the mixture model. These parameters are learned using an Expectation Maximization (EM) algorithm based on the given blendshape animation sequences A. To increase the robustness of these computations, the MPPCA is estimated in a latent space of the animation sequences A using principal component analysis. By keeping 99% of the total variance the dimensionality of the training data can be reduced by two-thirds allowing a more stable learning phase with the EM algorithm. Equation (8) can thus be rewritten as:

$$p(x,X_n)=\Sigma_{k=1}^K \pi k N(x,X_n|P\mu_k+\mu, PMP^T) \quad (9)$$

wherein $M=(C_k C_k^T+\sigma k^2 I)$ is the covariance matrix in the latent space, P is the principal component matrix, and g the mean vector. Since the EM algorithm converges to local minima, the algorithm can be run a plurality of times e.g. fifty times, with random initialization to improve the learning accuracy. A plurality (e.g. twenty) Gaussians are used to model the prior distribution and one-third of the latent space dimension is used for the PPCA dimension.

The likelihood distribution is then formulated. By assuming conditional independence, the likelihood distribution in Equation (5) can be modelled as the product $p(D|x)=p(G|x)p(I|x)$. The two factors capture the alignment of the blendshape model with the acquired depth map and texture image, respectively. The distribution of each likelihood term is represented as a product of Gaussians, treating each vertex of the blendshape model independently.

Let V be the number of vertices in the template mesh and $B \in R^{v \times m}$ the blendshape matrix. Matrix B is a user-specific expression model. Each column of B defines a blendshape base mesh such that Bx generates the blendshape representation of the current pose, wherein x is a collection of blendshape weights. $v_i=(Bx)_i$ denotes the i-th vertex of the reconstructed mesh (user-specific expression model). The likelihood term $p(G|x)$ models a geometric registration in the spirit of non-rigid ICP by assuming a Gaussian distribution of the per-vertex point-plane distances:

$$p(G|x) = \prod_{i=1}^V \frac{1}{(2\pi\sigma_{geo}^2)^{\frac{3}{2}}} \exp\left(-\frac{\|n_i^T(v_i - v_i^*)\|^2}{2\sigma_{geo}^2}\right), \quad (10)$$

wherein $n_i$ is the surface normal at $v_i$, and $v_i^*$ is the corresponding closest point in the depth map G.

The likelihood term $p(I|x)$ models texture registration. Since the user's face texture is acquired when building the facial expression model, it is possible to integrate model-based optical flow constraints, by formulating the likelihood function using per-vertex Gaussian distributions as:

$$p(I|x) = \prod_{i=1}^V \frac{1}{2\pi\sigma_{im}^2} \exp\left(-\frac{\|\nabla I_i^T(p_i - p_i^*)\|^2}{2\sigma_{im}^2}\right), \quad (11)$$

where $p_i$ is the projection of $v_i$ into the image I, $\Box I_i$ is the gradient of I at $p_i$, and $p_i^*$ is the corresponding point in the rendered texture image.

An optimization is them performed. In order to solve the MAP problem as defined by Equation (5) the negative logarithm is minimised:

$$x^*=\arg \min_x -\ln p(I|x) -\ln p(I|x) -\ln p(x, X_n). \quad (12)$$

Discarding constants, it can be written:

$$x^*=\arg \min_x E_{geo}+E_{im}+E_{prior}, \quad (13)$$

wherein, $$E_{prior} = -\ln p(x, X_n), \quad (14)$$

$$E_{geo} = \frac{1}{\sigma_{geo}^2} \sum_{i=1}^V \|n_j^T(v_i - v_i^*)\|^2 \quad (15)$$

and, $$E_{im} = \frac{1}{\sigma_{geo}^2} \sum_{i=1}^{V} \|\nabla I_i^T (p_i - p_i^*)\|^2. \quad (16)$$

The parameters $\sigma_{geo}$ and $\sigma_{im}$ model the noise level of the data that controls the emphasis of the geometry and image likelihood terms relative to the prior term. Since the system and method of the present invention provides real-time feedback, suitable values that achieve stable tracking performance can be experimentally determined. Settings such as $\sigma_{geo}=1$ and $\sigma_{im}=0.45$ may be chosen.

The optimization of Equation (13) can be performed efficiently using an iterative gradient solver, since the gradients can be computed analytically. In addition, the inverse covariance matrices and the determinants of the MPPCA may be precomputed during the offline learning phase. A gradient projection algorithm based on the limited memory BFGS solver may be used in order to enforce that the blendshape weights are between 0 and 1. The algorithm converges in less than six iterations as an efficient warm starting can be used with the previous solution. The closest point correspondences in $E_{geo}$ and $E_{im}$, are then updated and the MAP estimation is re-compute. It has been found that three iterations of this outer loop are sufficient for convergence.

The expression parameters are regularized using a dynamic expression prior, computed to prevent unrealistic facial poses/expressions.

This will ensure that the reconstructed animation lies in the space of realistic human facial expressions. The dynamic expression prior may be computed from a set of existing blendshape animations $A=\{A_1, \ldots, A_t\}$. Each animation Aj is a sequence of blendshape weight vectors $a_j^i \in R^m$ that sample a continuous path in the m-dimensional blendshape space. The temporal coherence of these paths may be exploited by considering a window of n consecutive frames, yielding an effective prior for both the geometry and the motion of the face of the user.

The expression parameters determined by the optimization calculation are preferably stored in a memory, so that they define animation priors.

In this particular example, the expression parameters are not in a form which is suitable to be processed by the animation tool which provides the digital character. Thus the expression parameters are mapped to character parameters (6); the mapping step transforms the expression parameters into a form (i.e. character parameters) which can be processed by the animation tool to update or animate the digital character so that the digital character mimics the face of the user (7).

The steps 4-9 which define the tracking stage (B) are repeated so that the face of the user is tracked over a period of time, and the digital character mimics the face of the user over that period of time.

In the above described method facial expressions are preferably represented as a weighted sum of blendshape meshes. This design choice offers a number of advantages: A blendshape model provides a compact representation of the facial expression space, thus significantly reducing the dimensionality of the optimization problem. In addition we can use existing blendshape animations that are ubiquitous in movie and game production, to define the dynamic expression priors. Finally, the output generated by method (i.e. the expression parameters) are preferably in the form of a temporal sequence of blendshape weights, which can be directly imported into commercial animation tools, thus facilitating integration into existing animation systems/ tools/production workflows. It will be understood that other means may be used to represent the facial expressions and output.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method of animating a digital character based on facial expressions of a user, comprising:
    obtaining a first series of two-dimensional (2D) images of a face of a user;
    obtaining a first series of three-dimensional (3D) depth maps of the face of the user;
    determining a set of blendshape weights associated with a generic expression model based on at least some of the first series of 2D images and at least some of the first series of 3D depth maps, the generic expression model representative of a generic person;
    identifying expression parameters for a user-specific expression model based on at least some of the set of blendshape weights, the user-specific expression model representative of the face of the user;
    tracking the face of the user by decoupling rigid motion of the user from non-rigid motion of the user based on at least some of the first series of 2D images and at least some of the first series of 3D depth maps, wherein the rigid motion represents a movement of the 3D depth map of the face of the user and the non-rigid motion represents a change in expression of the face of the user;
    determining animation parameters for a digital character based on the expression parameters, the rigid and non-rigid motions of the user, and an animation prior, the animation prior including a collection of animation parameters of the digital character, the animation prior indicative of a pre-defined animation of the generic expression model; and
    animating, based on the animation parameters, the digital character to mimic the face of the user.

2. The method of claim 1, wherein tracking the rigid motion of the user comprises aligning, based on at least some of the first series of 3D depth maps, the user-specific expression model to a position representing a position of the face of the user.

3. The method of claim 2, wherein aligning the user-specific expression model comprises using a pre-segmented template, the pre-segmented template excluding a chin region of the face of the user.

4. The method of claim 1, wherein tracking the non-rigid motion of the user comprises performing an optimization, using the animation prior and the expression parameters, to determine the animation parameters.

5. The method of claim 4, wherein tracking the non-rigid motion of the user comprises avoiding an unrealistic facial expression by regularizing the expression parameters with a dynamic expression prior, the dynamic expression prior based on a set of blendshape animations.

6. The method of claim 1, further comprising converting the expression parameters into a form readable by an animation tool to enable the animation tool to animate the digital character according to the expression parameters.

7. A system for animating a digital character according to facial expressions of a user, comprising:
memory containing a program code;
a display coupled to the memory; and
one or more processors coupled to the memory and the display, the one or more processors configured to execute the program code, the program code configured to cause the one or more processors to:
obtain a first series of two-dimensional (2D) images of a face of a user;
obtain a first series of three-dimensional (3D) depth maps of the face of the user;
determine a set of blendshape weights associated with a generic expression model based on at least some of the first series of 2D images and at least some of the first series of 3D depth maps, the generic expression model representative of a generic person;
identify expression parameters for a user-specific expression model based on at least some of the set of blendshape weights, the user-specific expression model representative of the face of the user;
track the face of the user by decoupling rigid motion of the user from non-rigid motion of the user based on at least some of the first series of 2D images and at least some of the first series of 3D depth maps, wherein the rigid motion represents a movement of the 3D depth map of the face of the user and the non-rigid motion represents a change in expression of the face of the user;
determine animation parameters for a digital character based on the expression parameters, the rigid and non-rigid motions of the user, and an animation prior, the animation prior including a collection of animation parameters of the digital character, the animation prior indicative of a pre-defined animation of the generic expression model; and
animate, based on the animation parameters, the digital character to mimic the face of the user on the display.

8. The system of claim 7, wherein the program code to track the rigid motion of the user comprises program code to align, based on at least some of the first series of 3D depth maps, the user-specific expression model to a position representing a position of the face of the user.

9. The system of claim 8, wherein the program code to align the user-specific expression model comprises program code to use a pre-segmented template, the pre-segmented template excluding a chin region of the face of the user.

10. The system of claim 7, wherein the program code to track the non-rigid motion of the user comprises program code to perform an optimization, using the animation prior and the expression parameters, to determine the animation parameters.

11. The system of claim 10, wherein the program code to track the non-rigid motion of the user comprises program code to prevent an unrealistic facial expression by regularizing the expression parameters with a dynamic expression prior, the dynamic expression prior based on a set of blendshape animations.

12. The system of claim 7, wherein the program code further comprises program code to convert the expression parameters into a form readable by an animation tool to enable the animation tool to animate the digital character according to the expression parameters.

13. A non-transitory program storage device containing instructions that, when executed by a computer system, cause the computer system to:
obtain a first series of two-dimensional (2D) images of a face of a user;
obtain a first series of three-dimensional (3D) depth maps of the face of the user;
determine a set of blendshape weights associated with a generic expression model based on at least some of the first series of 2D images and at least some of the first series of 3D depth maps, the generic expression model representative of a generic person;
identify expression parameters for a user-specific expression model based on at least some of the set of blendshape weights, the user-specific expression model representative of the face of the user;
track the face of the user by decoupling rigid motion of the user from non-rigid motion of the user based on at least some of the first series of 2D images and at least some of the first series of 3D depth maps, wherein the rigid motion represents a movement of the 3D depth map of the face of the user and the non-rigid motion represents a change in expression of the face of the user;
determine animation parameters for a digital character based on the expression parameters, the rigid and non-rigid motions of the user, and an animation prior, the animation prior including a collection of animation parameters of the digital character, the animation prior indicative of a pre-defined animation of the generic expression model; and animate, based on the animation parameters, the digital character to mimic the face of the user.

14. The non-transitory program storage device of claim 13, wherein the instructions to track the rigid motion of the user comprise instructions to align, based on at least some of the first series of 3D depth maps, the user-specific expression model to a position representing a position of the face of the user.

15. The non-transitory program storage device of claim 14, wherein the instructions to align the user-specific expression model comprise instructions to use a pre-segmented template, the pre-segmented template excluding a chin region of the face of the user.

16. The non-transitory program storage device of claim 13, wherein the instructions to track the non-rigid motion of the user comprise instructions to perform an optimization, using the animation prior and the expression parameters, to determine the animation parameters.

17. The non-transitory program storage device of claim 16, wherein the instructions to track the non-rigid motion of the user comprise instructions to prevent an unrealistic facial expression by regularizing the expression parameters with a dynamic expression prior, the dynamic expression prior based on a set of blendshape animations.

18. The non-transitory program storage device of claim 13, further comprising instructions to convert the expression parameters into a form readable by an animation tool to enable the animation tool to animate the digital character according to the expression parameters.

* * * * *